Sept. 26, 1939.  A. P. TAYLOR  2,174,428
MEANS FOR STRINGING AND SAGGING IN POWER CABLES AND THE LIKE
Filed March 9, 1939  2 Sheets-Sheet 1
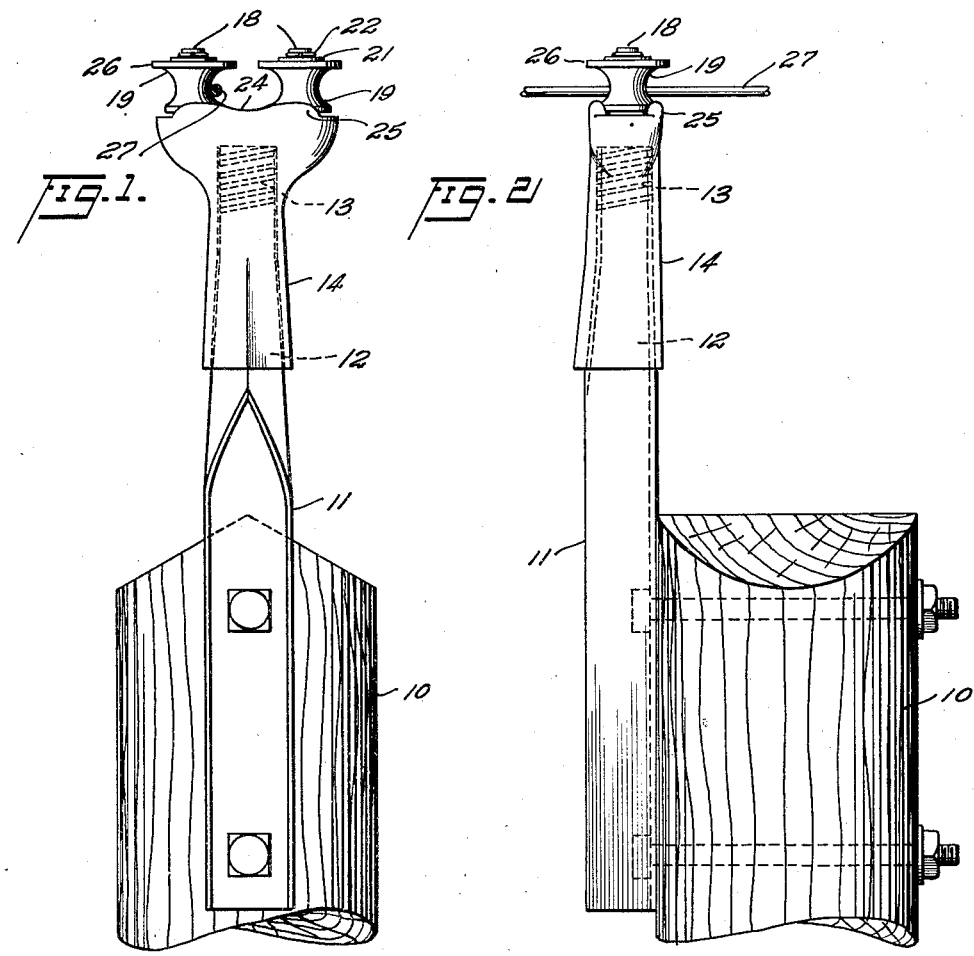
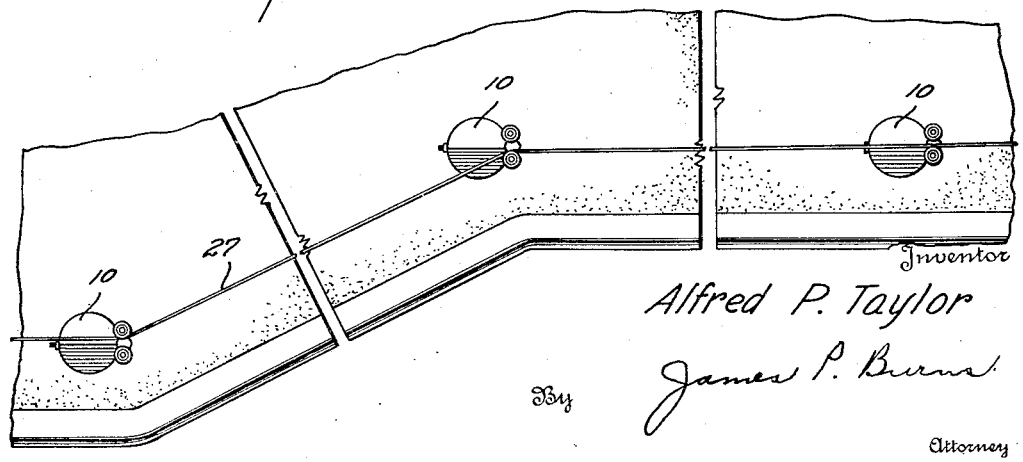
Inventor
Alfred P. Taylor
James P. Burns
By
Attorney

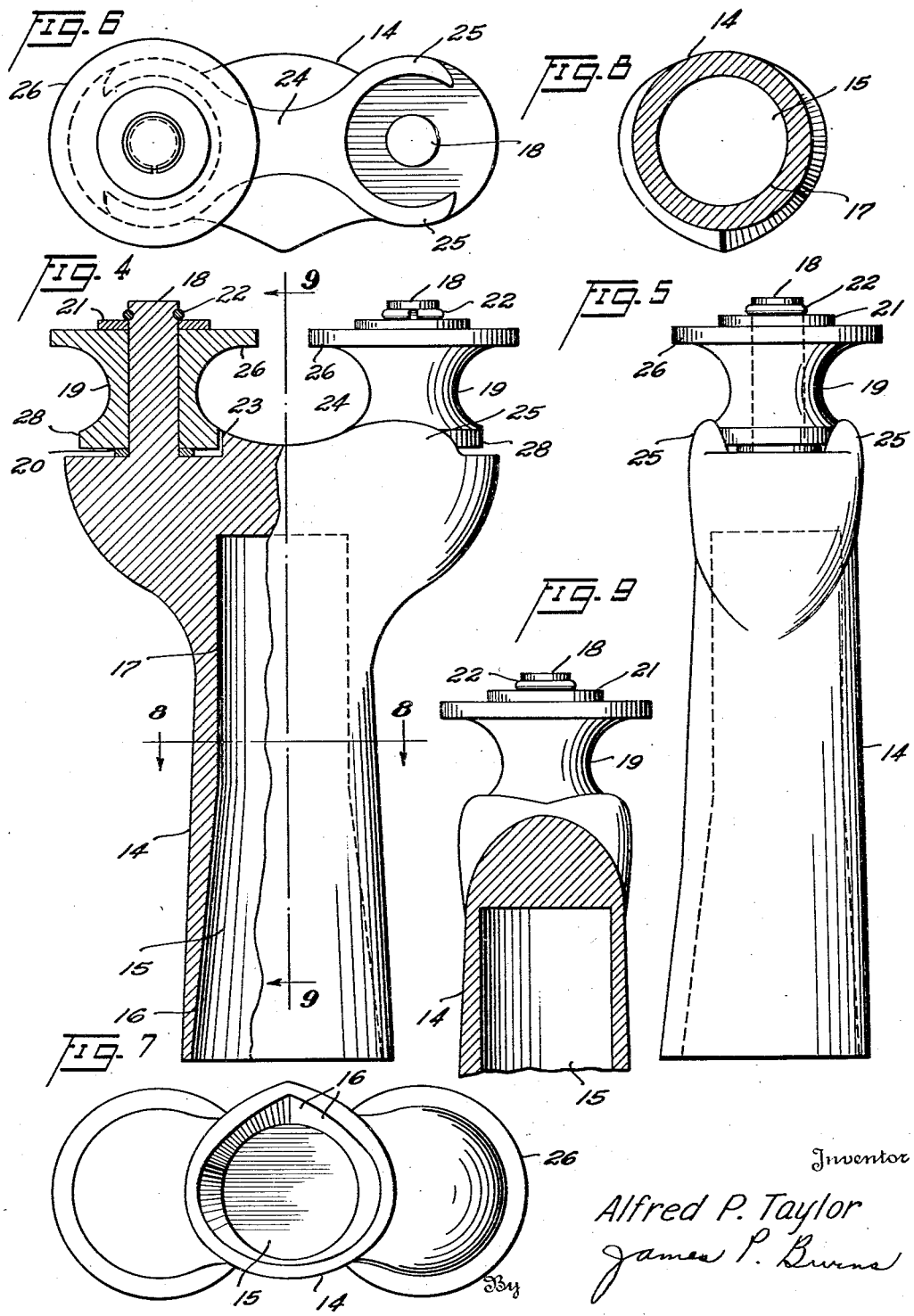

Patented Sept. 26, 1939

2,174,428

UNITED STATES PATENT OFFICE 2,174,428

MEANS FOR STRINGING AND SAGGING IN POWER CABLES AND THE LIKE

Alfred Paul Taylor, Kansas City, Mo., assignor, by mesne assignments, to Harry L. Cater, trustee, Kansas City, Mo.

Application March 9, 1939, Serial No. 260,839

6 Claims. (Cl. 175—376)

This invention relates to a device for facilitating the stringing and sagging in of the wires of power lines. More specifically, my invention relates to a device which is adapted to be mounted on a conventional pole top pin and the purpose of which is to act as a substantially frictionless support and guide for the electrical conductor during the stringing and sagging in operation.

In my copending application Serial Number 208,721, filed May 18, 1938, I have shown and described a device which is similar insofar as the general purpose of these devices is concerned. The device described in my copending application has met with considerable favor and has enjoyed some commercial success. Its use has resulted in a considerable reduction in the expense of the stringing and sagging in operation and has enabled the securing of a more even distribution of tension throughout the length of the power line than has heretofore been obtainable. With the increased use of this device, there has arisen a demand for a lighter and less expensive device to accomplish the same purpose.

It is therefore an object of my present invention to provide a device of the type described which is light in weight and inexpensive to manufacture.

Another object of my invention is to provide a device for use in stringing and sagging in power lines, the shape and weight of which will allow it to be conveniently carried in the belt or pocket of a workman when climbing a power line pole.

A further object of my invention is to provide a device which can be used as a support and guide for electrical conductors during stringing and sagging in operations regardless of whether the conductor continues in a straight line over the pole or defines an angle of less than 180 degrees in either direction from its line of approach.

A still further object of my invention is to provide a device of the type described in which the electrical conductor cannot become wedged or fast and which will prevent injury to the conductor by providing a substantially frictionless support and guide.

In the accompanying drawings, wherein like reference numerals are used to designate like parts in each of the several views, I have illustrated the preferred embodiment of my invention.

Figure 1 is a front elevation view of my device showing it mounted on a pole top pin;

Figure 2 is a side elevation view of the structure shown in Figure 1;

Figure 3 is a plan view of a series of poles, each having one of my devices mounted thereon and showing the manner in which an electrical conductor is guided and supported during the sagging in operation;

Figure 4 is an enlarged front elevation view of one of my devices showing it partly in cross-section;

Figure 5 is an enlarged side elevation view of one of my devices;

Figure 6 is a top plan view of my device with one of the sheaves removed;

Figure 7 is a bottom plan view;

Figure 8 is a sectional view taken along the line 8—8 of Figure 4; and

Figure 9 is a sectional view taken along the line 9—9 of Figure 4.

In the drawings, the reference numeral 10 designates poles which are used to support the power line. It is conventional to secure to the top of these poles pole top pins designated by the reference character 11. These pole top pins 11 are formed from a channel iron having the two sides of the channel iron folded inwardly along a portion of the length. This results in a portion of the length of the pin 11, such as that portion indicated at 12 in Figure 1, having a transverse cross-section of approximately triangular shape. The extreme upper end of the pole top pin 11 is customarily provided with suitable threads 13 adapted to receive a conventional insulator.

The stringing and sagging in device conforming to my invention is designed to be temporarily mounted upon the pole top pin 11 during the stringing and sagging in operation. To this end the device of my invention is provided with a base, designated generally by the reference character 14, having a cavity 15 therein which is of irregular transverse cross-section for a portion of its depth as indicated at 16 in Figure 7. That portion of the cavity 15 which is of irregular transverse cross-section is designed to fit snugly upon the portion 12 of the pole top pin 11, which, it will be noted, is of similar irregular cross-section. The remainder of the depth of the cavity 15 is of circular transverse cross-section as is indicated by the reference numeral 17 in Figure 8. The portion 17 of the cavity 15 which is of circular transverse cross-section is of sufficient diameter to allow clearance for the threads 13 on the pole top pin 11 so that the walls of the cavity will not come into contact with and injure the threads. It should be borne in mind that at no time is any part of the walls of the cavity 15 in engagement with the threads 13.

The base 14 is provided at its opposite end with projecting pins or axles 18. These axles may be cast integrally with the base or they may be in the form of studs which are screwed into tapped holes in the base. Mounted for rotation on the axles 18 are sheaves 19. In order to reduce friction between the base 14 and the sheaves 19, I prefer to provide a bearing surface 20 which may be cast integrally with the base or may be a separate washer surrounding the axle. The sheaves are held in position upon the axles by any suitable means such as washers 21 and spring clips 22.

As best shown in Figures 4 and 5, the end of the base 14 upon which the sheaves 19 are mounted is so shaped as to lie in close proximity to the greater part of the periphery of the lower flange 28 of each sheave. By reference to Figure 4, it will be seen that that portion of the base 14 lying between the two sheaves 19 is raised as shown at 23 and that the upper surface of this raised area has a downwardly concave face 24. Integral with the base and extending along and in close proximity to the periphery of the lower flange 28 of each sheave are ribs 25. The purpose of these ribs 25 (and of the raised portion of the base 23) is to prevent electrical conductors extending between the two sheaves from wedging between a sheave and the base regardless of the angle at which the conductor approaches or leaves the device.

The distance between the upper flanges 26 of the sheaves 19 when they are in position on the base 14 should be just sufficient to allow the insertion of a conductor or cable of any predetermined size. It will be understood that interchangeable sheaves having upper flanges of varying widths may be provided if desired.

In use, my device is placed upon a pole top pin such as 11 in Figure 1 and due to the configuration of the pole top pin and the cavity 15, the device will be secured against rotation on the pin in the position shown in Figure 1. At the same time, the thread 13 on the pole top pin 11 will be spaced from the walls of the cavity 15 so as not to be injured.

It will be understood that one of my devices is placed upon each pole throughout the length of the line which is being strung and sagged in. The electrical conductor 27 is placed between the sheaves and is permitted to rest upon the downwardly concaved area 24. After this has been done at each pole top, the conductor is in readiness to be pulled and tightened to the proper tension. As the conductor is tightened, it will assume the position such, for example, as shown in Figure 3. In those cases where the conductor must make an angle at the pole, the conductor will be supported on the concave face of one of the sheaves as shown in Figure 1. Of course, if the conductor makes an angle in the opposite direction the conductor will be supported by the concave face of the opposite sheave. In those instances where the conductor makes no angle at the pole, the conductor will lie upon the smooth downwardly concave surface 24 which will present very little frictional opposition to movements of the conductor. It will thus be seen that regardless of the angle at which the conductor approaches or leaves the pole it will be free to move through the support with no substantial friction. Due to the lack of friction, the conductor will adjust itself so that its tension is evenly distributed throughout its length and the condition of over stressing the conductor between certain poles and allowing sag between other poles is avoided. The use of my device also enables greatly increased lengths of conductor to be sagged in with one stretching operation, and the cost of sagging in is commensurately reduced.

After the stringing and sagging in operations are completed, the devices are replaced on the pole top pins by conventional insulators and the conductor is secured to the insulators in any suitable manner.

Although I prefer to construct my device of some light material such as aluminum alloy, it will be obvious that any other suitable material may be used. The sheaves are easily replaceable when they become worn and the useful life of my device is thereby increased.

Although I have illustrated the preferred embodiment of my invention, it will be obvious that various changes may be made therein without departing from the scope of my invention as defined in the following claims. Where the term "end" is used in the following claims it is not to be understood as referring to the comparative dimensions of the base, since it is obvious that the width of the base of my device could be increased without departing from the scope of my invention.

Having thus described my invention, I claim:

1. A device for stringing and sagging in wires comprising a base having a cavity of irregular transverse cross-section in one end thereof, said cavity being adapted to receive a pole top pin of similar irregular transverse cross-section whereby said base is mounted and secured against rotation on said pole top pin, a plurality of sheaves rotatably mounted on the opposite end of said base, upper and lower flanges on each of said sheaves and the lower flanges of said sheaves being positioned in recesses in said base whereby a wire extending between said sheaves is prevented access between said base and the lower flanges of said sheaves.

2. A device for stringing and sagging in wires comprising a base having a cavity of irregular transverse cross-section in one end thereof, said cavity being adapted to receive a pole top pin of similar irregular transverse cross-section, a pair of sheaves rotatably mounted in spaced relationship on the opposite end of said base, upper and lower flanges on each of said sheaves, a concave bearing surface on each of said sheaves, a portion of said base lying between said sheaves and presenting a smooth and unbroken continuation of the concave bearing surfaces of said sheaves, and ribs on said base extending from between said sheaves at least partly around and in close proximity to the periphery of the lower flange of each of said sheaves.

3. A device for stringing and sagging in wires comprising a base having means at one end thereof for mounting and securing said base against rotation on an insulator pin, a pair of sheaves rotatably mounted in spaced relationship on the opposite end of said base, a concave bearing surface on each of said sheaves, said base being provided with a wire supporting surface extending between said sheaves so formed as to present a smooth and unbroken continuation of the concave bearing surfaces on said sheaves.

4. A device for stringing and sagging in wires comprising a base having means at one end thereof for mounting said base on an insulator pin, a pair of sheaves rotatably mounted in spaced relationship on the opposite end of said base, upper and lower flanges on each of said sheaves and a projection on said base extending between said sheaves and so formed as to lie in contiguous and concentric relationship to adjacent portions of the peripheries of the lower flanges of each of said sheaves whereby a wire extending between said sheaves is prevented access between said base and the lower flange of either of said sheaves.

5. A device for stringing and sagging in wires comprising a base having means at one end thereof for mounting and securing said base against rotation on an insulator pin, a pair of sheaves rotatably mounted in spaced relationship on the opposite end of said base, upper and lower flanges on each of said sheaves, a concave bearing surface on each of said sheaves, said base being provided with a wire supporting surface intermediate said sheaves so formed as to present a smooth and unbroken continuation of the concave bearing surfaces on said sheaves and ribs on said base extending from said wire supporting surface at least partly around and in close proximity to the periphery of the lower flange of each of said sheaves.

6. A device for stringing and sagging in electric conductors comprising a base having a cavity in one end thereof for mounting and securing said base against rotation on an insulator pin, a pair of sheaves rotatably mounted in spaced relationship on the opposite end of said base, a concave bearing surface terminating in upper and lower flanges on each of said sheaves, said upper flanges being of such diameter as to leave only sufficient space between said upper flanges for the insertion of an electric conductor of the desired size between said sheaves and said base being provided with a wire supporting surface intermediate the lower flanges of said sheaves so formed as to present a smooth and unbroken continuation of the concave bearing surfaces on said sheaves.

ALFRED PAUL TAYLOR.